No. 752,479. PATENTED FEB. 16, 1904.
J. W. SUTTON.
COOLING ATTACHMENT FOR INTERNAL COMBUSTION ENGINES.
APPLICATION FILED SEPT. 3, 1903.
NO MODEL.
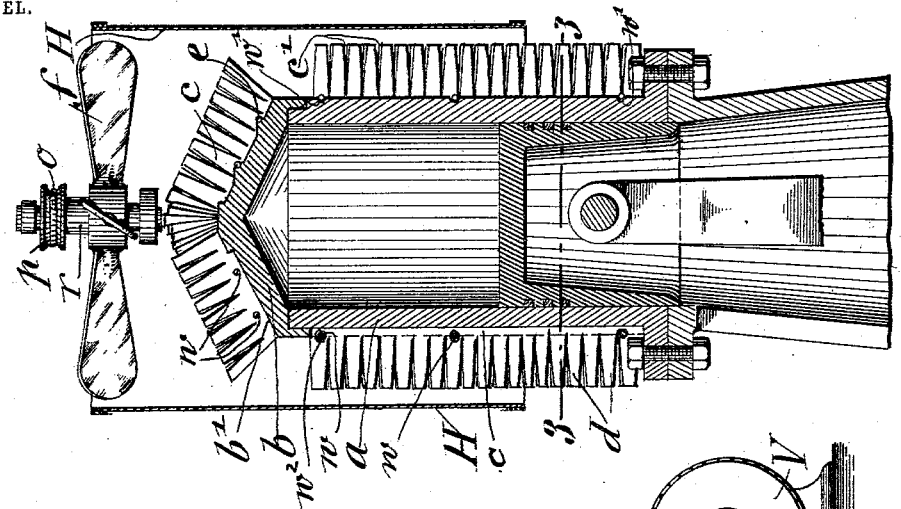
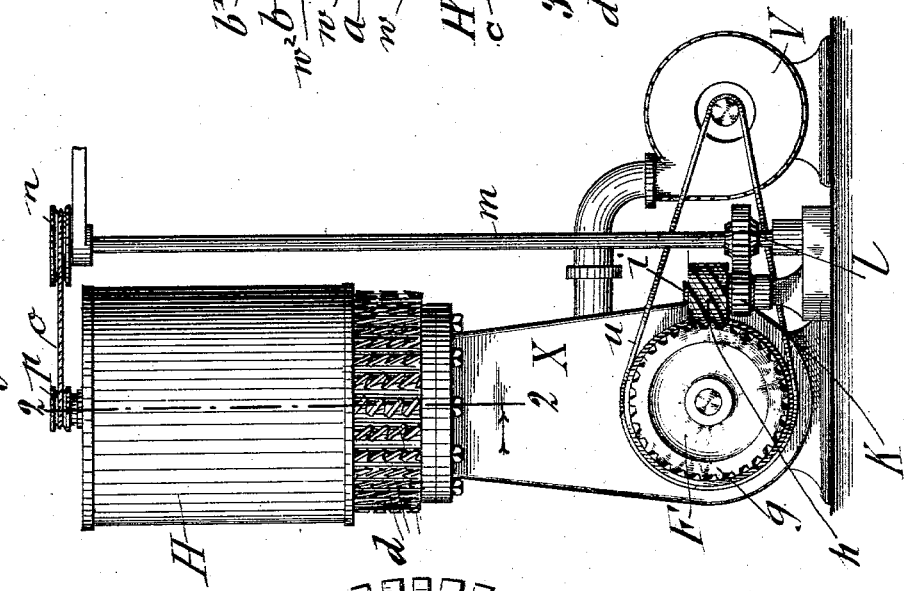
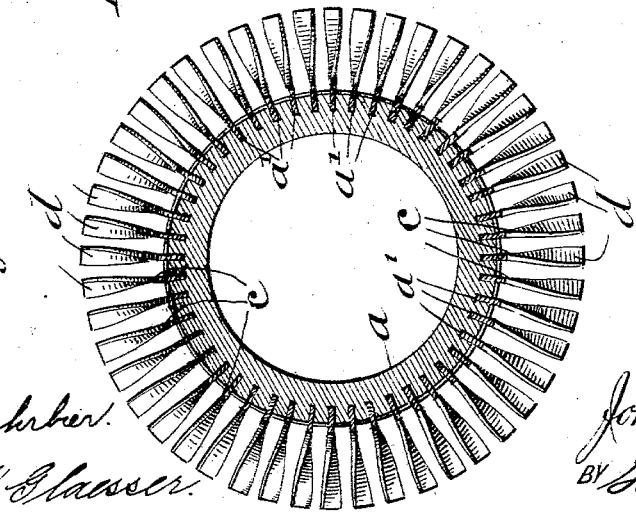
WITNESSES
INVENTOR
John W. Sutton
BY
ATTORNEYS No. 752,479. Patented February 16, 1904.

UNITED STATES PATENT OFFICE.

JOHN W. SUTTON, OF NEW YORK, N. Y.

COOLING ATTACHMENT FOR INTERNAL-COMBUSTION ENGINES.

SPECIFICATION forming part of Letters Patent No. 752,479, dated February 16, 1904.

Application filed September 3, 1903. Serial No. 171,813. (No model.)

*To all whom it may concern:*

Be it known that I, JOHN W. SUTTON, a citizen of the United States, residing in New York, borough of Brooklyn, and State of New York, have invented certain new and useful Improvements in Cooling Attachments for Internal-Combustion Engines, of which the following is a specification.

This invention relates to means for cooling those parts of internal-combustion engines, other motors, or metallic vessels which are subjected to high temperatures in such a manner that a reduction of temperature is produced with the least possible addition to the weight of the structure from which the heat is to be radiated.

It is well known that various methods have been adopted heretofore for reducing the temperature to the lowest possible point. Most of the means heretofore used, however, have the disadvantage that they increase the weight of the structure to a considerable extent—such, for instance, as the well-known cooling-jacket, the heat-distributing ribs which are cast on the exterior surface of the cylinder, the means for producing the exterior-air cooling of said cylinder, and the like.

The object of this invention is to produce means for cooling the cylinders of internal-combustion engines or other motors so that without adding appreciably to the weight of the same a large and effective heat-radiating surface is obtained, which is cooled by the natural air-current to which the engine is subjected during motion or by artificial air-currents, or both, so that engines provided with my improved cooling means are better adapted for motor-bicycles, automobiles, and similar vehicles than the engines provided with the means heretofore employed; and for this purpose the invention consists of a cylinder and head of an internal-combustion engine or other metallic vessel provided on its outer surface with grooves, strips in said grooves having slits or incisions forming vanes, each of which is bent or twisted in a position obliquely to the length of the strips, so that each side of the same is in contact with the air-current, and means for retaining said strips in said grooves; and the invention consists, further, of a hood surrounding the cylinder of an internal-combustion engine some distance from the top of the vanes for supplying air-currents into the spaces between said strips and the vanes formed thereon; and the invention consists, further, of certain details of construction and combinations of parts, which will be fully described hereinafter and finally pointed out in the claims.

In the accompanying drawings, Figure 1 represents a side elevation of an internal-combustion engine, showing the cylinder provided with my improved means for cooling the same. Fig. 2 is a vertical section through the cylinder and head of the same, drawn on a larger scale and showing the air-supplying means in elevation; and Fig. 3 is a horizontal section on line 3 3, Fig. 2, of the cylinder, also drawn on a larger scale.

Similar letters of reference indicate corresponding parts.

Referring to the drawings, $a$ represents the cylinder of an internal-combustion engine such as are used for motor-cycles, automobiles, and similar vehicles. The cylinder $a$ is provided with a conical head $b$. On the outer surface of the cylinder $a$ are arranged longitudinal grooves $a'$ and on the head $b$ corresponding radial grooves $b'$, into which are inserted longitudinal strips $c$ of suitable sheet metal, preferably copper or aluminium. These strips are divided by slits or incisions $c'$, extending inwardly from their outer edges for nearly their whole width into a number of narrow portions, which are bent or twisted in a position obliquely to the length of the strips, so as to form vanes $d$, so that each side is in contact with the air-current, as shown most clearly in Fig. 3. The twisted portions or vanes serve at the same time as deflectors, by means of which air is deflected toward the cylinder, causing thereby the air not only to come in contact with the vanes, but also to come in contact with the cylinder. The air impinging against the front side of one vane is also deflected against the rear side of the adjacent vane, by means of which all sides of the vanes are in contact with the cooling-air, so that an effective dissipation of heat takes place.

The uncut inner edges of the strips $c$ are inserted into the longitudinal grooves of the cylinder $a$ and retained in the same by any suitable means, such as circumferential wires $w$, which are seated in annular grooves $w'$ of the cylinder and which are passed through perforations $w^2$ in the unslitted portions of the strips $c$, or the grooves may be dovetailed and the inner uncut edges of the slit shaped correspondingly and slipped in from the ends of the grooves, or any other means for fastening the inner edges of the strips to the exterior surface of the cylinder or other metallic body may be used, the main point being to obtain an intimate connection between the inner or uncut portion of the strips and the exterior surface of the cylinder. The head $b$ of the cylinder $a$ is provided, besides the radial grooves, with annular grooved lugs $e$, which are preferably cast integral with the head and which serve as seats for the retaining-wires, as shown in the upper part of Fig. 2. The radial strips for the heads may also be retained on the head by dovetailing the radial grooves and shaping the inner uncut edges of the strips correspondingly, or any other means of attachment may be used by which the radial strips are firmly secured in position thereon. As the radial strips of the head would crowd up too much at the center of the head, it is preferable to shorten the alternate heat-radiating strips and permit only every second or third strip to run through to the center of the head, as shown in Fig. 2, so that in this manner the head, as well as the body of the cylinder, is provided with the requisite number of heat-radiating strips.

By the bent or twisted short vanes of the strips attached to the body and head of the cylinder the channels between the strips are reduced in width and the vanes presented with their edges to the natural or artificial current of air that flows between the spaces, so that thereby an increased surface is exposed to the cooling action of the air-current, for the reason that the sides of the vanes, as well as the front edge, are exposed to the action of the cooling air-current.

For producing artificial air-currents a fan $f$ is supported in suitable bearings (not shown in the drawings) axially in line with the cylinder above the head of the same and rotated by suitable motion-transmitting mechanism interposed between the fly-wheel on the crank-shaft of the engine and the shaft of the fan, as shown in Fig. 1. This mechanism, for which any other suitable motion-transmitting means may be substituted, consists of a gear-wheel $g$ on the shaft of the engine, meshing with a worm $h$ on a shaft $i$, provided with a pinion $k$, meshing with a gear-wheel $l$ on a rotatable standard $m$. To the upper end of this standard $m$ is attached a pulley $n$, on which a rope $o$, passing over another pulley, $p$, on the shaft $r$ of the fan $f$, passes. The fly-wheel F of the engine is provided with a belt $u$, driving a blower V, connected with the crank-casing X.

The fan $f$, as well as the heat-radiating strips on the cylinder, is surrounded by a cylindrical hood H, which serves to direct the air-current supplied by the fan $f$ onto the heat-radiating strips $d$ of the head and body, so that the heat-dissipating action of the strips is still more increased.

Inasmuch as the strips are made of comparatively thin sheet metal the weight of the cylinder is imperceptibly increased, while a greatly-enlarged heat-radiating surface and a more effective cooling than by the ordinary air-current is obtained. In case of injury to the cylinder or heat-radiating strips the latter can be readily removed by detaching them from the grooves of the cylinder and replacing them by new strips, so that repairs incident to accidents to bicycles or automobiles can be made with little expense without impairing the effectiveness of the large heat-radiating surface.

I claim as new and desire to secure by Letters Patent—

1. In an internal-combustion engine, the combination, with the cylinder, of longitudinal heat-radiating strips, and means for attaching the same to the exterior surface of the cylinder, said heat-radiating strips being provided with slits or incisions and vanes twisted obliquely to the length of the strips, substantially as set forth.

2. In an internal-combustion engine, the combination, with the cylinder provided with exterior longitudinal grooves, of longitudinal heat-radiating strips inserted in said grooves, and means for attaching said strips to the cylinder, said strips being provided with inward slits or incisions and intermediate vanes twisted obliquely to the length of the strips, substantially as set forth.

3. In an internal-combustion engine, the combination, with the head of the cylinder provided with radial grooves, of heat-radiating strips inserted in said grooves, and means for retaining said strips on said head, said strips being provided with inward slits or incisions and intermediate vanes twisted obliquely to the length of the strips, substantially as set forth.

4. In an internal-combustion engine, the combination, with the cylinder and head, said cylinder being provided with longitudinal grooves and said head with radial grooves, of longitudinal and radial strips inserted in the grooves of said cylinder and head, and means for retaining said strips in position thereon, said heat-radiating strips being provided with inward slits or incisions and intermediate vanes twisted obliquely to the length of the strips, substantially as set forth.

5. The combination, with the cylinder and head of an internal-combustion engine provided with grooves and strips in said grooves provided with inward slits or incisions and intermediate vanes twisted obliquely to the length of the strips, of a hood surrounding said cylinder some distance from the top of the vanes, and means exterior to the head of the cylinder within said hood for forcing air between the vanes and between the vanes and the hood, substantially as set forth.

In testimony that I claim the foregoing as my invention I have signed my name in presence of two subscribing witnesses.

JOHN W. SUTTON.

Witnesses:
   PAUL GOEPEL,
   C. P. GOEPEL.